US012671184B2

(12) United States Patent
Koparan et al.

(10) Patent No.: US 12,671,184 B2
(45) Date of Patent: Jun. 30, 2026

(54) ANTENNA ARRANGEMENT FOR MIMO ANTENNA APPLICATIONS

(71) Applicant: HUBER+SUHNER AG, Herisau (CH)

(72) Inventors: Cenk Koparan, Herísau (CH); Francesco Merli, Thal (CH)

(73) Assignee: HUBER+SUHNER AG, Herisau (CH)

( * ) Notice: Subject to any disclaimer, the term of this patent is extended or adjusted under 35 U.S.C. 154(b) by 83 days.

(21) Appl. No.: 18/858,151

(22) PCT Filed: Apr. 12, 2023

(86) PCT No.: PCT/EP2023/059478
§ 371 (c)(1),
(2) Date: Oct. 18, 2024

(87) PCT Pub. No.: WO2023/208576
PCT Pub. Date: Nov. 2, 2023

(65) Prior Publication Data

US 2025/0279583 A1 Sep. 4, 2025

(30) Foreign Application Priority Data

Apr. 29, 2022 (CH) ................................ 00501/2022

(51) Int. Cl.
*H01Q 9/42* (2006.01)
*H01Q 1/28* (2006.01)
(Continued)

(52) U.S. Cl.
CPC ........... *H01Q 9/0421* (2013.01); *H01Q 1/288* (2013.01); *H01Q 1/42* (2013.01); *H01Q 1/526* (2013.01)

(58) Field of Classification Search
CPC ........ H01Q 9/0421; H01Q 9/42; H01Q 1/288; H01Q 1/3275; H01Q 1/42; H01Q 1/526;
(Continued)

(56) References Cited

U.S. PATENT DOCUMENTS 10,263,345 B2 4/2019 Ng et al.
2011/0156971 A1 6/2011 Yang et al.
(Continued)

FOREIGN PATENT DOCUMENTS

EP 3 407 422 A1 11/2018
WO WO-2016139403 A1 * 9/2016 .............. H01Q 7/00
(Continued)

OTHER PUBLICATIONS

Parolari, R., et al., "A Novel 3D Antenna for LTE MIMO Systems," 2017 Int'l Conf. Elect. & Elec. Tech. for Auto., AEIT, Jun. 15, 2017, pp. 1-4.

(Continued)

*Primary Examiner* — Awat M Salih
(74) *Attorney, Agent, or Firm* — Pauley Erickson & Swanson

(57) ABSTRACT

An antenna arrangement includes a baseplate having a center, a bottom face and a top face. At least two first antenna elements are arranged on the top face and extend radially away from the center. Each of the at least two first antenna elements comprises a with respect to the base plate essentially perpendicular arranged first section, which is arranged radially towards the center. The first section merges into a second section which is arranged with respect to the base plate essentially parallel and extends away from the first section in a first direction. The second section merges into a third section arranged with respect to the base plate essentially perpendicular extending away from the second section above the first section. The third section merges into a fourth section arranged with respect to the base plate essentially parallel extending away from the third section opposite to the first direction.

20 Claims, 5 Drawing Sheets

(51) Int. Cl.
*H01Q 1/42* (2006.01)
*H01Q 1/52* (2006.01)
*H01Q 9/04* (2006.01)

(58) Field of Classification Search
CPC .......... H01Q 1/523; H01Q 5/371; H01Q 5/42; H01Q 21/20; H01Q 21/28
See application file for complete search history.

(56) References Cited

U.S. PATENT DOCUMENTS

| | | | | |
|---|---|---|---|---|
| 2013/0154890 | A1* | 6/2013 | Jan | H01Q 1/521 343/770 |
| 2016/0164190 | A1* | 6/2016 | Daurer | H01Q 9/40 343/770 |
| 2017/0025766 | A1 | 1/2017 | Su et al. | |
| 2018/0219282 | A1* | 8/2018 | Hefele | H01Q 1/42 |
| 2019/0386384 | A1 | 12/2019 | Villa | |
| 2021/0021041 | A1* | 1/2021 | Chiu | H01Q 9/0407 |
| 2022/0085496 | A1* | 3/2022 | Nair | H01Q 21/08 |
| 2023/0420856 | A1* | 12/2023 | Karilainen | H01Q 9/285 |

FOREIGN PATENT DOCUMENTS

| | | | |
|---|---|---|---|
| WO | WO 2018/133426 | A1 | 7/2018 |
| WO | WO 2019/205846 | A1 | 10/2019 |

OTHER PUBLICATIONS

EPO (Rijswijk, NL), English version of the International Search Report, Form PCT/ISA/210, for corresponding International Application PCT/EP2023/059478, Jun. 26, 2023 (3 pp.).

* cited by examiner

ANTENNA ARRANGEMENT FOR MIMO ANTENNA APPLICATIONS

CROSS REFERENCE TO RELATED APPLICATION

This application is a National Phase filing in the United States, under 35 USC § 371, of PCT International Patent Application PCT/EP2023/059478, filed on 12 Apr. 2023 which claims the priority of Swiss Patent Application No. CH 000501/2022, filed 29 Apr. 2022.

The above-referenced applications are hereby incorporated by reference herein in their entirety and are made a part hereof, including but not limited to those portions which specifically appear hereinafter.

BACKGROUND OF THE INVENTION

Field of the Invention

The present disclosure relates to an antenna arrangement for MIMO antenna applications.

Discussion of Related Art

US 2011/0156971 published by Hon Hai Prec. Ind. Co. LTD on 30 Jun. 2011 relates to a wide band antenna, which includes a radiation element, a ground surface, a dielectric element, and a RF connector. The radiation element is connected to the ground element and includes a first radiation part and a second radiation part. The first radiation part includes at least one slit for obtaining low frequency-bands. The second radiation part is for obtaining high frequency-bands. The dielectric element supports and spaces the radiation element and the ground element. The RF connector is connected to the second part of the antenna and the ground element.

WO 2019/205846 published by University Southeast on 31 Oct. 2019 relates to a miniaturized three-frequency-band unidirectional radiation antenna. The bottom of a quasi-L-shaped metal plate of the antenna is connected to a metal floor. Two sides of a horizontal part of the quasi-L-shaped metal plate are bent inwards, the middle part of a vertical part thereof is recessed inwards, and two sides of the lower part of the vertical part are bent inwards. A bent metal monopole is located below the quasi-L-shaped metal plate and is vertically arranged on the metal floor, the lower part of the bent metal monopole is a triangular impedance-matching part, and a three-dimensional U-shaped groove is engraved on the bent metal monopole. A coaxial waveguide feed line is located at a circular hole in the bottom of the metal floor and an inner conductor of the coaxial waveguide feed line is connected to the bottom of the bent metal monopole. By using the structure of the present invention, a miniaturized three-frequency-band unidirectional radiation antenna with high radiation efficiency can be realized and the lowest operating frequency band is an ultra-wide frequency band with a relative bandwidth of up to 4:1.

WO 2018/133426 published by X Trip Inf. Tech. Co. LTD on 26 Jul. 2018 relates to a foldable dual-band antenna based on a U-shaped slit structure, comprising a foldable metal sheet and an SMA connector. The tail portion of the foldable metal sheet is inwardly folded once to form a tail portion metal sheet, the front portion of the foldable metal sheet is inwardly folded four times to sequentially form a bottom portion metal sheet, an outer side metal sheet, a top portion metal sheet, an inner side metal sheet and an intermediate metal sheet. A ground terminal of the SMA connector is connected to the bottom portion metal sheet in a welded manner, the bottom portion metal sheet being provided with a hole and a feeder line of the SMA connector passes through the hole of the bottom portion metal sheet and is welded to the intermediate metal sheet to form a feed connection point. A U-shaped slit resonator is hollowed out on the intermediate metal sheet around the feed connection point, the effective electrical length of the U-shaped slit resonator in 2.4 GHz band being one-half wavelength. The present utility model can achieve the dual-band function of the TVWS operating band of 470-790 MHz and Wi-Fi operating band of 2.4 GHz without the necessity of increasing the size of the existing foldable metal sheet antenna, enabling the miniaturization of the antenna.

SUMMARY OF THE INVENTION

Multiple Input Multiple Output (MIMO) antenna arrangements are known and widely used for various applications. MIMO antenna arrangements make use of the effect that by increasing the number of receiving and transmitting antenna elements, it is possible to increase the throughput of the channel with every pair of antenna elements added to the system. This makes MIMO wireless technology one of the most important wireless techniques to be employed in recent years. As spectral bandwidth is becoming an ever more valuable commodity for radio communications systems, techniques are needed to use the available bandwidth more effectively.

In particular, for all kinds of vehicles, like trains, busses or even agriculture machines, low profile MIMO antenna arrangements, mainly for communication purposes in multiple bands are desired. The antenna elements used for MIMO antenna arrangements can typically be made as plate shaped elements with specific geometries, cups or bent structures. The antenna elements are typically made of bent sheet metal, by die-casting or from a metalized polymer. In principle good antenna characteristics can also be achieved with planar inverted-F antenna elements (PIFA) or monopole antenna elements on a PCB, like e.g. from ANTRONICS and GALTRONICS. Nevertheless, the main disadvantage of those antenna elements is that they radiate mainly in the vertical direction. Especially for applications like rooftop antenna arrangements on vehicles, it is desired to keep the height of the overall antenna arrangement as low as possible. Modern communication systems operate in MIMO configuration to increase data throughput, so multiple antenna elements in one antenna arrangement are required. These antenna elements shall cover multiple operation bands and also provide maximum isolation to each other.

One of the problems to be solved by the present disclosure can therefore be seen in providing an antenna arrangement which has a low profile without negatively impacting the broadband characteristics.

Folded monopole antenna elements have the advantage of being broadband and low profile. To achieve MIMO characteristics with folded monopole antenna elements, multiple antenna elements can be arranged on a common base element, like a base plate. Good results can be achieved when between two and up to six antenna elements are arranged in a windmill-like arrangement on a base plate, equally spaced apart from each other in circumferential direction. This allows to arrange multiple, in a preferred variation four antenna elements, on a small area and still providing sufficient (10-15 dB) isolation between them to allow MIMO operation.

An antenna arrangement according to the present disclosure usually comprises a baseplate which baseplate has a center, a bottom face and a top face. The baseplate can be designed as an essentially rotationally symmetrical disc, which comprises a port. In a preferred variation, the port is arranged at the center of the baseplate and extends away from the bottom face of the baseplate in the vertical direction. Good results regarding the structural integrity of the baseplate can be achieved when the baseplate has stiffening elements. A variation of the baseplate comprises stiffening elements in a honeycomb, or grid shaped manner. The antenna arrangement typically comprises a radome, which is mounted on the baseplate and houses the antenna elements. The radome is preferably screwed to the baseplate and a sealing strip is arranged between the radome and the baseplate. The sealing strip can be a ring shaped foam plastic that seals the antenna arrangement against environmental influences. For MIMO operations, usually at least two first antenna elements are arranged on the top face of the baseplate. In a preferred variation, the first antenna elements are arranged on the base plate in a rotational symmetric manner with respect to each other and if appropriate with respect to the base plate, i.e. the arrangement looks the same after some rotation by a partial turn. Typically, the at least two first antenna elements are not in contact with each other. They can be arranged on the baseplate opposite with respect to each other and each spaced a distance apart from the center of the baseplate.

The first antenna element as described hereinafter in more detail can be in principle used in a variety of antenna arrangements. The first antenna element should thus be considered a separate inventive concept, which may be made subject of one or several divisional patent applications. The first antenna element can be arranged concentrically with respect to a center point or port of an antenna arrangement. A number of first antenna elements can be arranged, being equally spaced with respect to each other, circumferentially around the center. Alternatively, or in addition, a number of first antenna elements can be arranged in a line or parallel to each other in several lines. The first antenna element typically comprises a with respect to a base plate essentially perpendicular arranged first section. The first section can merge into a second section arranged with respect to the base plate essentially parallel and extends away from the first section in a first direction. The second section merges into a third section which is arranged with respect to the base plate essentially perpendicular extending away from the second section above the first section. The third section merges into a fourth section arranged with respect to the base plate essentially parallel extending away from the third section opposite to the first direction.

Good antenna characteristics can be achieved when the first antenna elements are arranged on the base plate in a windmill-like arrangement equally spaced apart from each other in circumferential direction. First antenna elements in the form of folded monopole antenna elements allow a windmill-like arrangement which allows a uniform radiation pattern in the horizontal directions and still provides sufficient isolation between the first antenna elements and therefore allow MIMO operations. Good results can be achieved when the first antenna elements are made from bent sheet metal. A folded first antenna element allows to significantly reduce the height of the antenna elements, which allows building antenna arrangements with a low overall profile. The first antenna elements comprise in total at least four sections which can be made in an integral manner. Alternatively, or in addition, the at least two first antenna elements can be arranged on the baseplate being equally spaced apart with respect to the center of the antenna arrangement. The at least two first antenna elements can thereby be arranged in a manner such that the first through the fourth section of the first first antenna element are arranged parallel with respect to the first through the fourth section of the second of the first antenna element. The at least two antenna elements can be arranged point symmetrical with respect to the center point.

Each of the at least two first antenna elements typically comprises a with respect to the base plate essentially perpendicular arranged first section, which is, in general direction, arranged radially towards or at an angle with respect to the center. The first section can comprise a lower edge, which lower edge comprises a feeding port. The feeding port can be designed as a foot that extends away from the lower edge and is arranged on the top face of the baseplate. Typically, the feeding port serves for feeding the signal into the first antenna element via wiring. Good results regarding the directivity can be achieved when the lower edge comprises a flat portion and a curved portion. The curved portion can extend between the feeding port and the dorsal end of the first antenna element, extending away from the top face of the base plate. The curved portion of the lower edge can locally merge into an upper edge and thereby form a recess in the upper edge and/or the second section. The flat portion may extend between the feeding port and the distal end of the first antenna element, preferably essentially parallel to the baseplate.

A lower edge with an asymmetric geometry, wherein the curved portion faces the dorsal end and the flat portion faces the distal end can improve the broad band characteristics, especially at higher frequencies. Besides a lower edge with an asymmetric geometry, the first antenna element can comprise a grounding element which is arranged adjacent to the curved portion of the lower edge at the dorsal end of the first antenna element. The grounding element can be part of the first section and designed as an essentially rectangular section which extends away from the lower edge and merges into the top face. The grounding element is typically designed to interconnect the first antenna element to the base plate. The grounding element can provide isolation between the first antenna elements and therefore allows to arrange the at least two first antenna elements closer together on the baseplate with respect to each other.

The first section of the first antenna element typically merges into a second section arranged with respect to the base plate. The first section is typically connected to the base plate via the feeding port. The second section extends essentially parallel to the baseplate and away from the first section in a first direction. In a variation the first section and the second section are made in an integral manner rom sheet metal and the second section is formed by bending along a straight edge. The second section of the first antenna element typically merges into a third section. The third section is with respect to the base plate arranged essentially perpendicular. In a variation the third section extends essentially parallel to the first section above the baseplate. The third section extends away from the second section above the first section. The third section can also be made by bending along an additional straight edge.

Good results can be achieved when a shielding element is arranged transversal with respect to radial direction of the first antenna element. The shielding element can be arranged adjacent to the second section and the third section. In a variation where the first antenna element is made from bent sheet metal, the shielding element can be designed as a lug which extends away from the second section and/or the third section adjacent to the grounding element. The shielding element arranged at the dorsal end of the first antenna element allows tuning of return loss depending on frequencies and provides both directivity and better isolation at low height.

The third section of the first antenna element typically merges into a fourth section arranged with respect to the base plate essentially parallel extending away from the third section opposite to the first direction. The dimensions of the fourth section impact the tuning of return loss depending on frequencies and therefore provide both directivity and better isolation at low height. To achieve an aerodynamically more advantageous overall design, the fourth section can be arranged at an angle with respect to the top face of the base plate sloping towards the distal end of the first antenna element. This allows that a radome with a sloped top face can be mounted onto the antenna arrangement which can lower the air resistance of the overall antenna arrangement.

The first through the fourth sections of the first antenna element can be planar and merge into each other by straight edges in an angled manner. This allows to manufacture the first antenna element from a stamped sheet metal part which is bent along straight edges. To increase the stability of the first antenna element, a stabilizer can be arranged at the first antenna element. Good results can be achieved when the stabilizer is arranged at the dorsal end interconnecting at least the fourth section of the first antenna element to the ground plate. In a variation the stabilizer is made from a non-conductive plate which is plugged into the first antenna element and screwed to the baseplate. The plate can be made of a pressed fiber material and comprise at least one lug that is inserted into a recess or through hole in at least one of the four sections of the first antenna element.

Good results regarding the directivity can be achieved when the first through the fourth sections form transversal to the radial direction an essentially hook-shaped cross section. Such a design allows to reduce the height of the first antenna element to essentially 0.2-0.35 times the wavelength, but still radiating the main energy in azimuth direction. In a preferred variation the MIMO antenna arrangement comprises four first antenna elements designed as folded monopoles respectively cellular antennas with 0.6-7.5 GHz and a height below 0.1 the wavelength.

In addition, at least one fourth section can comprise attachment means to attach a second antenna element. The attachment means can be designed as a window in the fourth section configured to receive the second antenna element. A PCB with a mm-wave antenna, e.g. 25-30 GHz, can be arranged in and/or on the fourth section with little interference with the first antenna element. The windmill-like arrangement allows to also arrange at least one additional third antenna element in circumferential direction between neighboring first antenna elements. For communication purposes the at least one third antenna element is preferably designed as a WiFi antenna element. The at least one WiFi antenna element can be mounted in a standing manner. The typically plate shaped at least one WiFi antenna element cane be arranged on the top face and extend away from the baseplate in the vertical direction.

Additional space in the center of the baseplate cane be used to arrange an additional antenna which is directed in the vertical direction. In particular, for navigation purposes a Global Navigation Satellite System (ONSS)-antenna, like a GPS module can be arranged at the center of the antenna arrangement. Good results can be achieved when the GNSS-antenna is designed as a Glonas and/or Galileo satellite with typically 1.7 GHz. The GNSS-antenna can be arranged between the at least two first antenna elements in a top view. To achieve favorable radiation and/or receiving characteristics, the GNSS-antenna can be attached to a radome encompassing in an assembled position the at least two first antenna elements. The GNSS-antenna can be suspended from the radome and/or be mounted on a frame, which is elevated from the top face of the baseplate.

In a variation, to improve the transmission and reception of lower frequencies, e.g. in the range of 400 MHz, the third and fourth section of the antenna element can be split into two radiators with different lengths as described in more detail hereinafter. Good results can be achieved, when the third section and/or the fourth section are split by a channel into a first radiator and a second radiator. In a top view the first radiator can have a squared shape, and the second radiator can be U-shaped and arranged circumferentially around the first radiator. To be able to achieve a resonance of lower frequencies e.g. 400 MHz, the directivity of the antenna element over the full band can be enhanced and the isolation between adjacent antenna elements can be improved by arranging a resonating reflector. The resonating reflector can be designed as a conductive layer arranged on the baseplate. In a top view the two first antenna elements can each be arranged on an essentially L-shaped conductive layer. The conductive layer can be realized either as an additional sheet metal or as a printed circuit board (PCB).

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims.

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
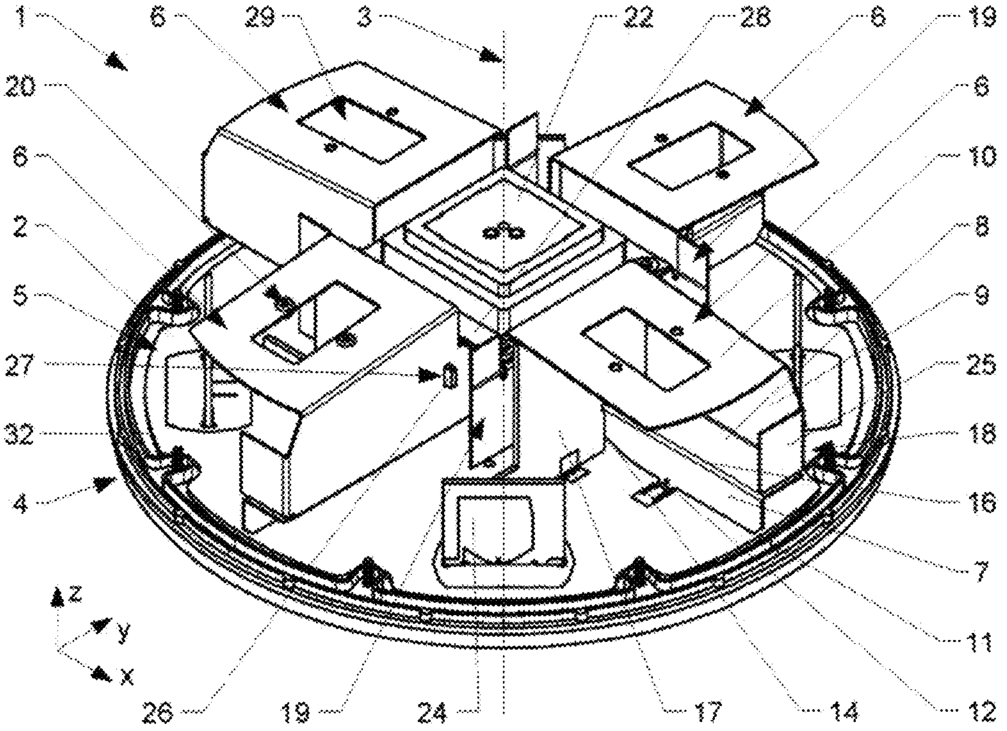
FIG. 1 shows a perspective view on a first variation of the antenna arrangement from the front and above with removed radome.

FIG. 1 shows a perspective view on a first variation of the antenna arrangement 1 from the front and above with removed radome. The shown variation of the antenna arrangement 1 comprises a baseplate 2 which baseplate 2 has a center 3, a bottom face 4 and a top face 5. In the shown variation the antenna arrangement 1 comprises four first antenna elements 6 which are arranged on the top face 5 of the baseplate 2 in a rotational symmetric manner with respect to each other, respectively the center of the base plate 2. Therefore, when the antenna arrangement 1 is, in the shown variation, rotated by 90°, the arrangement of the first antenna elements 1 looks the same. In the shown variation the first antenna elements 6 mainly extend in the horizontal directions x, y allowing a comparatively compact design of the first antenna elements 6 with a low profile in the vertical direction z. The shown first antenna elements 6 in the form of folded monopole radiators allow a windmill-like arrangement which provides sufficient isolation for MIMO operation. The shown first antenna elements 6 are made from bent sheet metal. The folded design allows to significantly reduce the height of the first antenna elements 6, which allows building antenna arrangements 1 with a low overall profile. The shown first antenna elements 6 comprise in total at least four sections 7, 8, 9, 10 which are in the shown variation made in an integral manner.

The shown first antenna element 6 comprises at the dorsal end 13 a shielding element 19 which is arranged transversal with respect to radial direction of the first antenna element 6. The shielding element 19 is arranged adjacent to the second section 8 and the third section 9. In the shown variation the first antenna element 6 is made from bent sheet metal and the shielding element 19 is designed as a lug 25 which extends away from the third section 9 adjacent to the grounding element 15. The shielding element 19 is arranged at the dorsal end 13 adjacent to the grounding element 15 and allows tuning of return loss depending on frequencies and provide both, directivity and better isolation at low height.

In the shown variation the first 7 through the fourth 10 sections of the first antenna element 6 are planar and merge into each other by straight edges 16 in an angled manner. This allows to manufacture the first antenna element 6 from a stamped sheet metal part which is bended along straight edges 16. To increase the stability of the first antenna element 6, a stabilizer 17 is arranged at the first antenna element 6. The shown stabilizer 17 is arranged at the dorsal end 13 interconnecting at least the fourth section 10 of the first antenna element 6 to the base plate 2. In the shown variation, the stabilizer 17 is made from a non-conductive material as a plate-shaped element which is plugged into the first antenna element 7 and screwed to the baseplate 2. The plate can be made of a pressed fiber material and comprise at least one lug 26 that is inserted into a recess or through hole 27 in the third sections 9 of the first antenna element 6.

Figure 2:
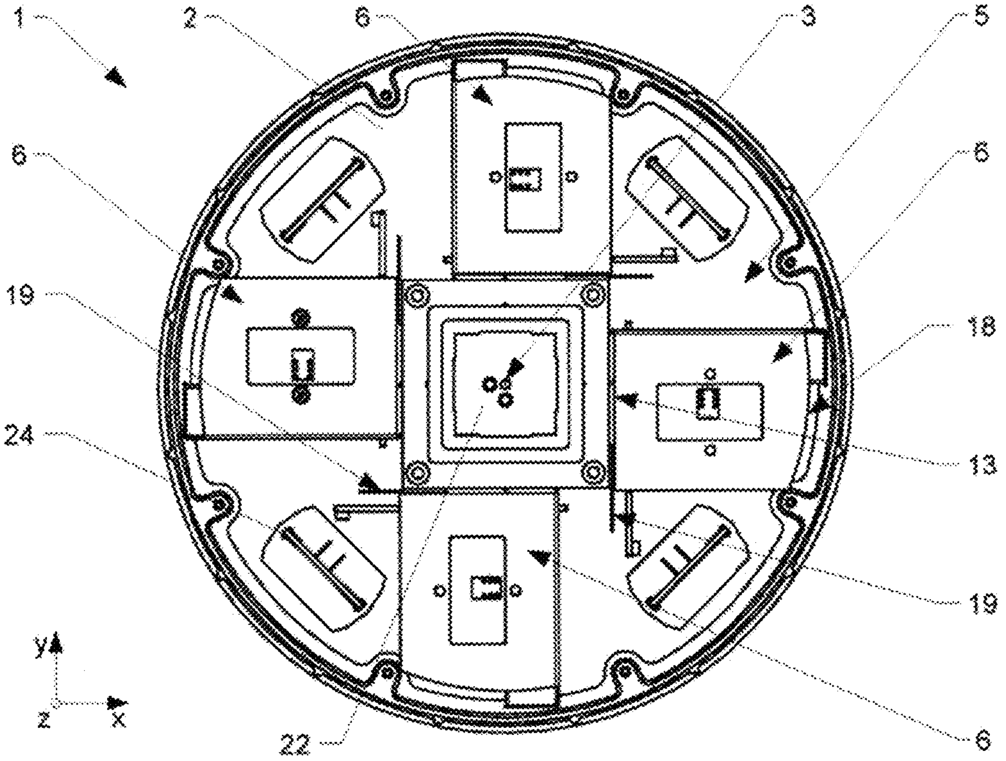
FIG. 2 shows a top view on the variation of the antenna arrangement according to FIG. 1.

As can be obtained best from FIG. 2, which shows a top view on the variation of the antenna arrangement 1. The first antenna elements 6 are not in direct contact with each other. In the shown variation two pairs of two first antenna elements 6 each are arranged on the baseplate 2 opposite with respect to each other and each spaced a distance apart from the center 3 of the baseplate 2. As can be seen from the top view, the first antenna elements 6 are arranged on the base plate 2 in a windmill-like arrangement equally spaced apart from each other in circumferential direction resulting in good antenna characteristics. The additional space in the center 3 of the baseplate 2 is used to arrange an additional GNSS antenna 22, like a GPS module, which is directed in the vertical direction z. In particular, for navigation purposes the GNSS antenna 22 is arranged at the center 3 of the antenna arrangement 1. Good results can be achieved when the GNSS antenna 22 is designed as a Glonas and/or Galileo satellite with typically 1.7 GHz. The shown GNSS-antenna 22 is arranged between the first antenna elements 6 on a frame 28.

The fourth sections 10 of the first antenna elements 6 each comprise attachment means 20 to attach a second antenna element (not shown). The attachment means 20 of the shown variation are designed as a window 29 configured to receive the second antenna element. E.g. a PCB with a mm-wave antenna, e.g. 25-30 GHz, can be arranged in and/or on the forth section with little interference with the first antenna element 6. Besides the second antenna elements, additional third third antenna elements 24 can be arranged in circumferential direction between neighboring first antenna elements 6. For communication purposes the shown third antenna elements 24 are preferably designed as a WiFi antenna element. The WiFi antenna elements 24 are mounted in a standing manner. The typically plate shaped WiFi antenna elements are arranged on the top face 5 and extend away from the baseplate 2 in the vertical direction z.

Figure 3:
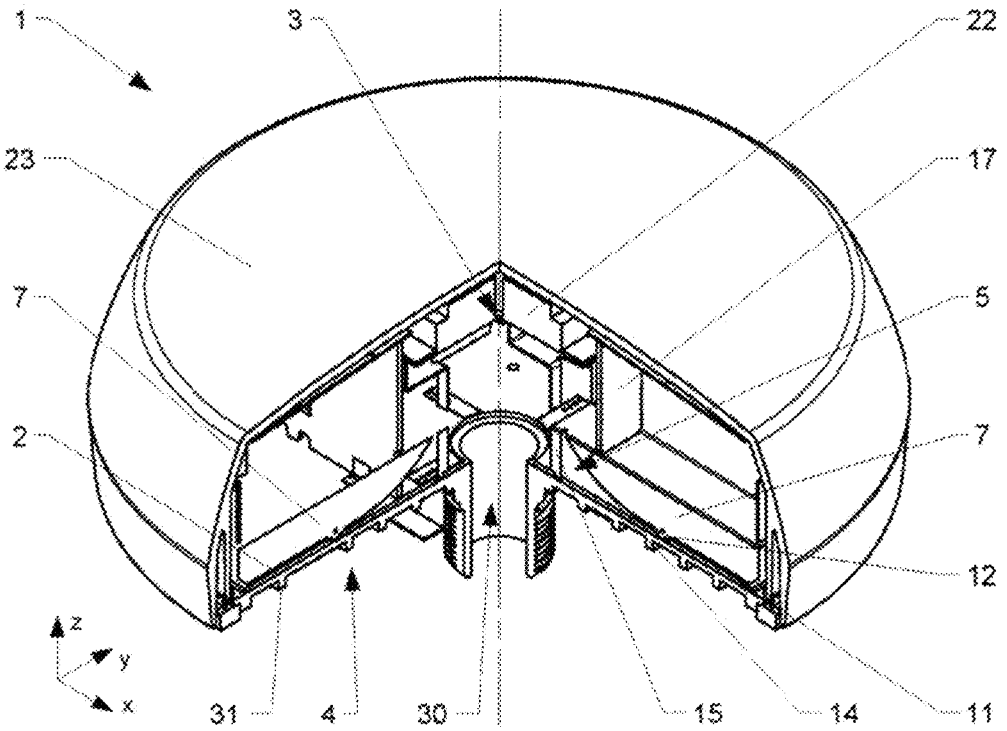
FIG. 3 shows a perspective view with a partial cut-out of the variation of the antenna arrangement according to FIG. 1 from the front and above with assembled radome.

FIG. 3 shows a perspective view with a partial cut-out of the variation of the antenna arrangement 1 from the front and above with assembled radome 23. The shown baseplate 2 is designed as an essentially rotationally symmetrical disc, which comprises a port 30. The shown port 30 is arranged at the center 3 of the baseplate 2 and extends away from the bottom face 4 of the baseplate 2. Good results regarding the structural integrity can be achieved when the baseplate 2 has stiffening elements 31. In the shown variation the baseplate 2 comprises stiffening elements 31 in a honeycomb, or grid shaped manner. The antenna arrangement 1 also comprises a bell-shaped radome 23 which is mounted on the base plate 2 and houses the first antenna elements 6. The bell-shaped radome 23 is screwed to the baseplate 2 and a sealing strip 32 is arranged between the radome 23 and the baseplate 2. The sealing strip 32 is designed as a ring shaped foam plastic that seals the antenna arrangement 1 against environmental influences. The shown GNSS-antenna is attached to the radome 23 encompassing in the assembled position the first antenna elements 6. The shown ONSS-antenna 22 is attached to the radome 23 by screwing in a suspended manner. The elevated position of the GNSS-antenna 24 mounted on the frame 28 improves the antenna characteristics of the GNSS-antenna 22.

Figure 4:
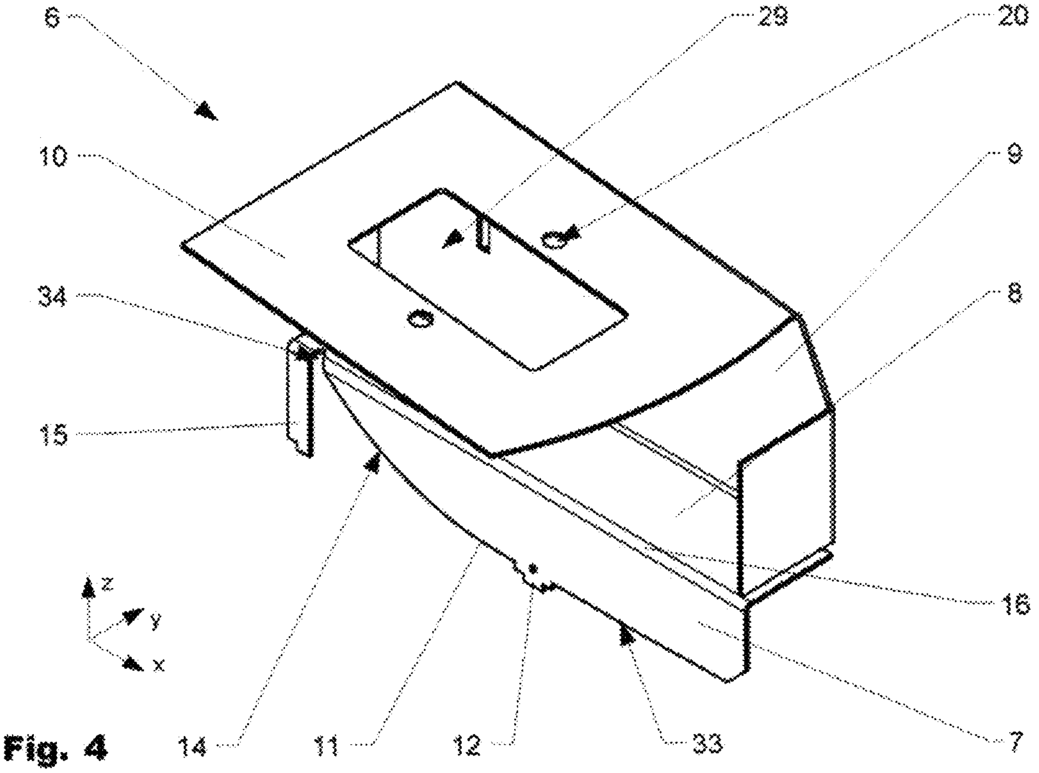
FIG. 4 shows a perspective view on a first variation of the first antenna element from the front and above with removed radome.

FIG. 4 shows a perspective view of a first variation of the first antenna element 6 from the front and above with removed radome 24. The shown first antenna element 6 comprises a with respect to the base plate 2 essentially perpendicular arranged first section 7, which is arranged radially towards the center 3. The shown first section 7 comprises a lower edge 11, which lower edge 11 comprises a feeding port 12. The shown feeding port 12 is designed as a foot that extends from the lower edge 11 and is arranged on the top face 4 of the baseplate 2. The feeding port 12 serves for feeding the signal into the first antenna element 6 via wiring. Good results regarding the directivity can be achieved when the lower edge 11 comprises a flat portion 33 and a curved portion 14. The curved portion 14 extends between the feeding port 12 and the dorsal end 13 of the first antenna element 6 and extends away from the top face 4 of the base plate 2. The curved portion 14 of the lower edge 11 locally merges into an upper edge 16 and thereby forms a recess 34 in the upper edge 16 and/or the second section 7.

The curved portion 14 faces the dorsal end 13 and the flat portion 33 faces the distal end 18 which improves the broad band characteristics of the overall first antenna element 6, especially at higher frequencies. Besides the lower edge 11 with an asymmetric geometry, the shown first antenna element 6 also comprises a grounding element 15 which is arranged adjacent to the curved portion 14 of the lower edge 11 at the dorsal end 13 of the first antenna element 6. The grounding element 15 of the shown variation is part of the first section 7 and designed as an essentially rectangular section extending away from the lower edge 11 and merging into the top face 5. The grounding element 15 is designed to interconnect the first antenna element 6 to the base plate 2. The grounding element 15 is designed to provide isolation between the first antenna element 6 and therefore allows to arrange the first antenna element 6 on the baseplate 2 closer towards and with respect to another first antenna element 6.

Figure 5:
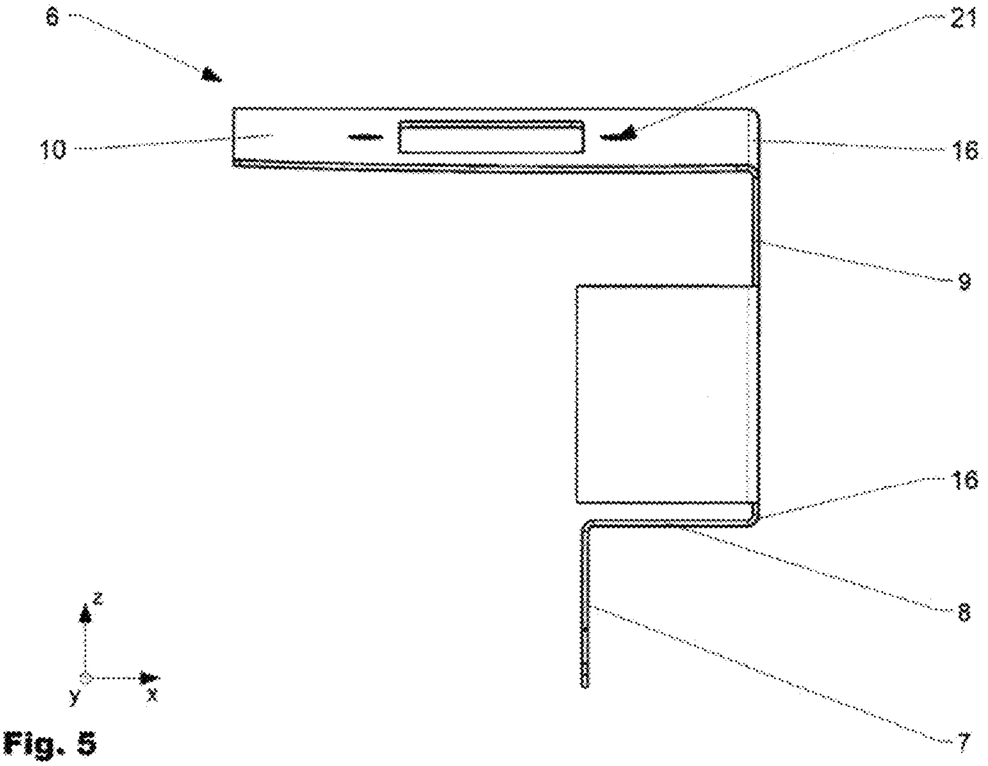
FIG. 5 shows a lateral view on the variation of the first antenna element according to FIG. 4.

As can be best obtained from FIG. 5, which shows a lateral view on the variation of the first antenna element 6. The first 7 through the fourth 10 sections form transversal to the radial direction x an essentially hook-shaped cross section. Such a design allows for a low height of the first antenna element 6 in vertical direction z by still achieving good results regarding the directivity can be achieved when. The first section 7 of the shown first antenna element 6 typically merges into a second section 8. The shown second section 8 is arranged parallel with respect to the base plate 2. The first section 7 is typically connected to the base plate 2 via the feeding port 12. The shown second section 7 extends essentially parallel to the baseplate 2 and away from the first section 7 in a first direction. In a variation the first section 7 and the second section 8 are made in an integral manner and the second section 8 is formed by bending along a straight edge 11. The second section 7 of the first antenna element 6 merges into a third section 8. The third section 9 of the shown variation is with respect to the base plate 2 arranged essentially perpendicular. In the shown variation the third section 9 extends essentially parallel to the first section 7 and above the baseplate 2. The third section 9 extends away from the second section 8 above the first section 7. The third section 9 is also made by bending along another straight edge 11.

The third section 9 of the shown first antenna element 6 merges into a fourth section 10 which is arranged with respect to the base plate 2 essentially parallel and extends away from the third section 9 opposite to the first direction. The dimensions of the fourth section 10 impact the tuning of return loss depending on frequencies and therefore provide both, directivity and better isolation at low height. To achieve an aerodynamically more advantageous overall design, the shown fourth section 10 is arranged at an angle with respect to the top face 5 of the base plate 2 sloping towards the distal end 18 of the first antenna element 6. This allows that a radome 23 with a sloped top face can be mounted onto the antenna arrangement 1 which can lower the air resistance of the overall antenna arrangement 1.

Figure 6:
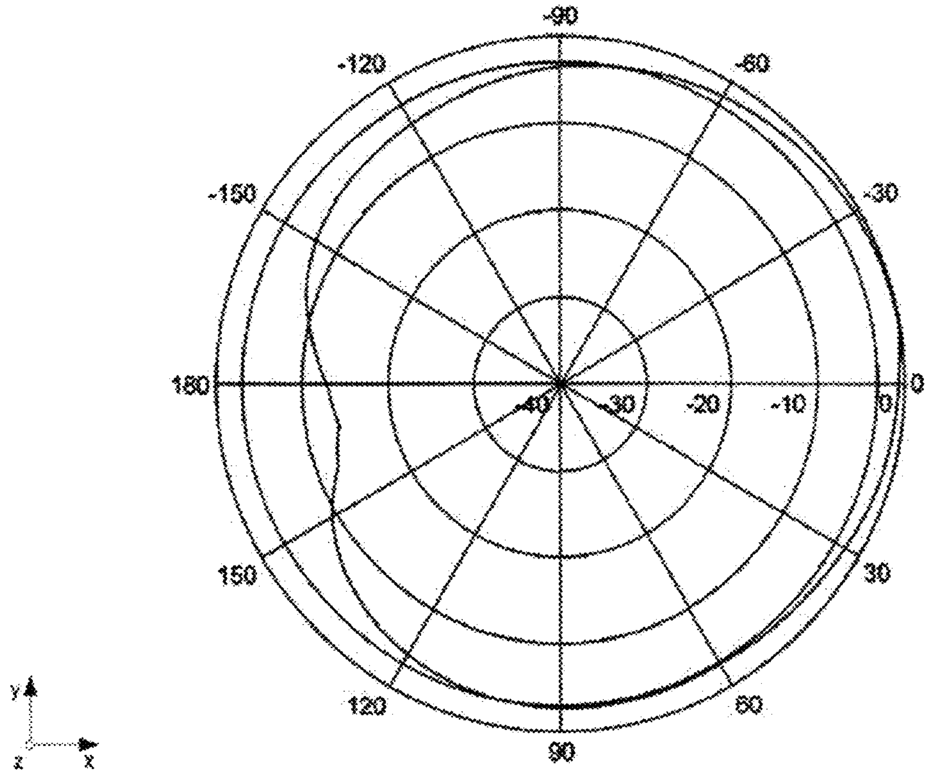
FIG. 6 shows a plot of the radiation characteristics of one the first antenna elements in the horizontal direction.

FIG. 6 shows a plot of the radiation characteristics of one first antenna element 1 in the horizontal direction. The plot results from a measurement of a design wherein the height of the first antenna element 1 is essentially 0.2-0.35 times the wavelength. The plot shows the radiation in the azimuth direction, which is the x, y direction. The measurement results from a first antenna element 1 without additional ground-plate, i.e. the first antenna element 1 as shown throughout FIGS. 1 to 5 but without a roof. Independent of the frequency, the first antenna element 1 has very similar radiating characteristics and the horizontal distribution is essentially similar. The shown graph in FIG. 6 is measured at 790 MHz and shows that the radiation characteristic of the first antenna element 1 is in circumferential direction quite uniform.

Figure 7:
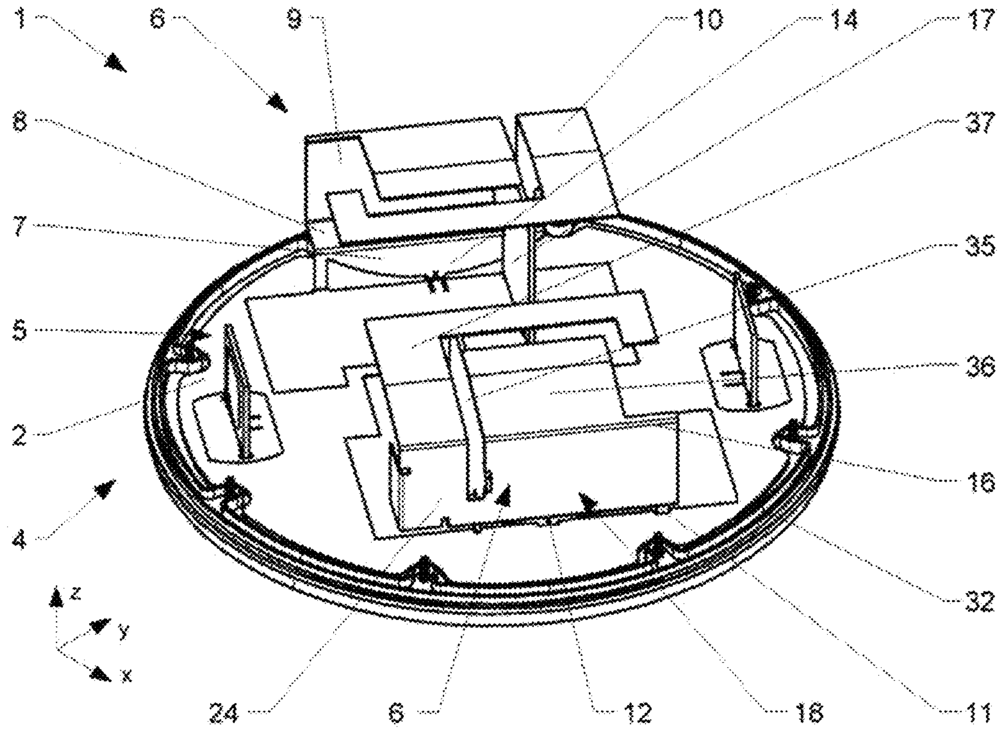
FIG. 7 shows a perspective view on a second variation of the antenna arrangement from the front and above with removed radome.

FIG. 7 shows a perspective view on a second variation of the antenna arrangement 1 from the front and above with removed radome 23. The shown variation of the antenna arrangement 1 comprises a baseplate 2 which baseplate 2 has a center 3, a bottom face 4 and a top face 5. In the shown variation, the antenna arrangement 1 comprises two first antenna elements 6, which are arranged on the top face 5 of the baseplate 2 in a rotational symmetric manner. The two first antenna elements 6 are arranged with respect to the center 3 in a manner, wherein the first 7 through the fourth 10 section of the first first antenna element 6 are arranged parallel with respect to the first 7 through the fourth 10 section of the second first antenna element 6. The shown first antenna elements 6 comprise in total at least four sections 7, 8, 9, 10 which are in the shown variation made in an integral manner. The third section 9 and the fourth section 10 of the shown variation are split by a channel 35.

Figure 8:
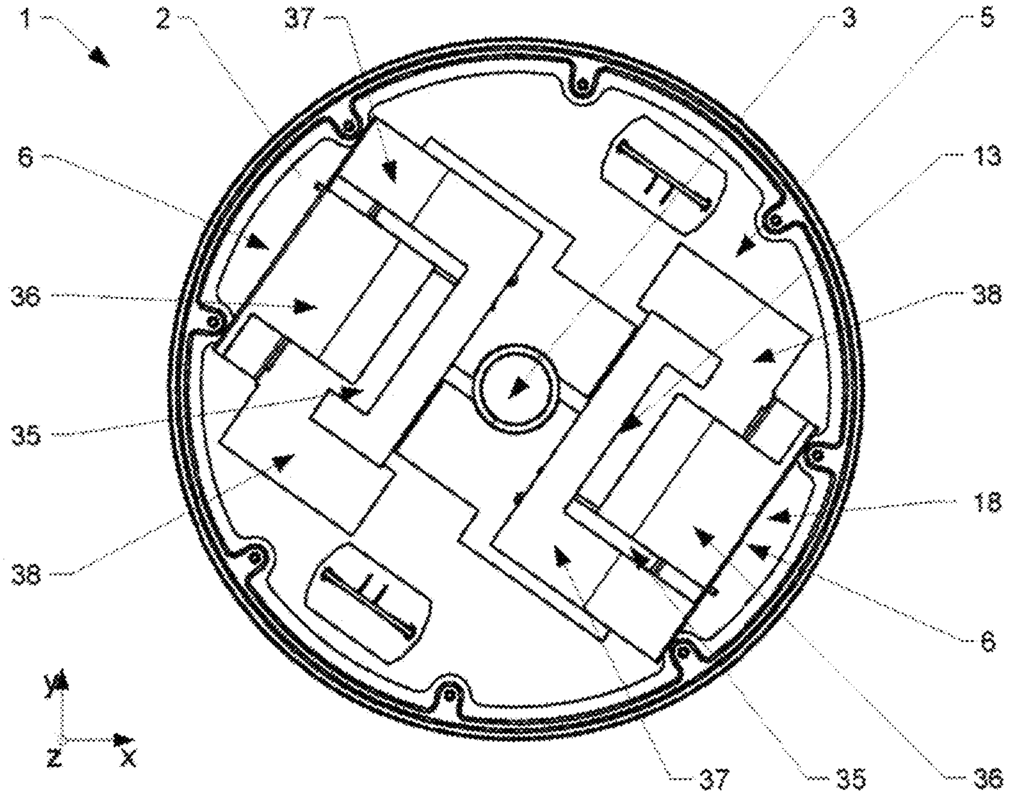
FIG. 8 shows a top view on the variation of the antenna arrangement according to FIG. 7.
Figure 9:
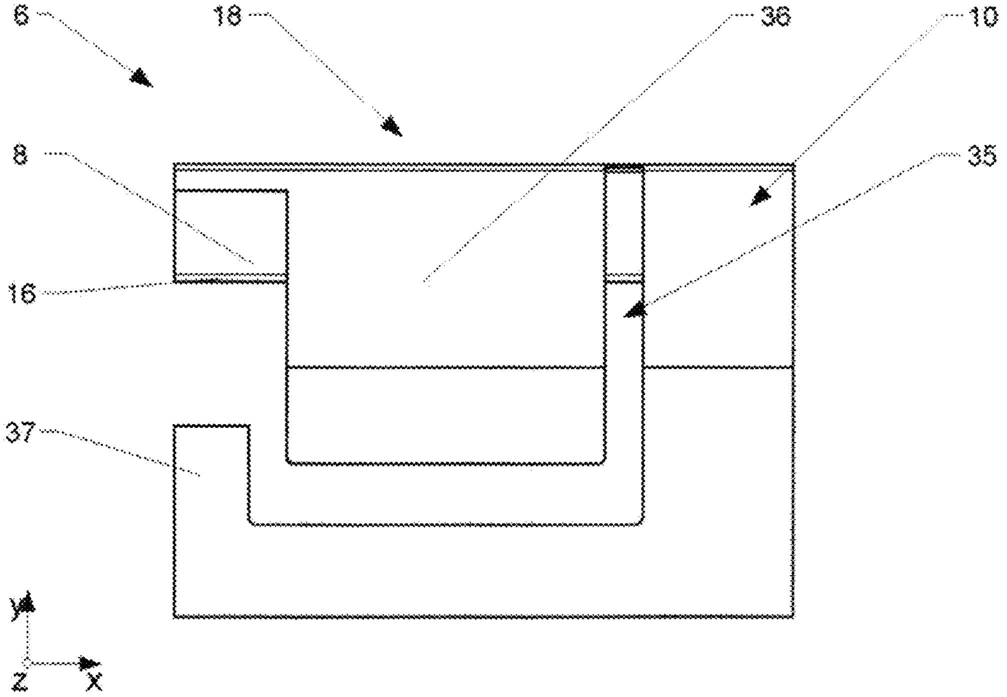
FIG. 9 shows a top view on a second variation of the first antenna element.

FIGS. 8 and 9 show a top view on the second variation of the antenna arrangement 1 respectively a top view on the second variation of the antenna arrangement 1. The shown first antenna elements 6 in FIG. 8 are made from bent sheet metal and arranged point symmetric with respect to the center 3. In the shown variation, to allow to transmit and receive lower frequencies, e.g. in the range of 400 MHz, the third 9 and fourth 10 section of the respective first antenna element 6 are split into two radiators with different lengths. The shown channel 35 divides the third 9 and the fourth 10 section into a first radiator 36 and a second radiator 37. As shown in FIG. 9, in a top view the first radiator 36 has a squared shape and the second radiator 37 is U-shaped and arranged circumferentially around the first radiator 9. To be able to achieve a resonance at the lower frequency of e.g. 400 MHz, the directivity of the first antenna element 6 over the full band can be enhanced and the isolation between adjacent first antenna elements 6 can be improved by arranging a resonating reflector. The resonating reflector can be designed as a conductive layer 38 arranged on the baseplate. The shown two first antenna elements 6 are each arranged on an essentially L-shaped conductive layer 38. The shown resonating reflector can be realized either as an additional sheet metal or as a PCB.

Figure 10:
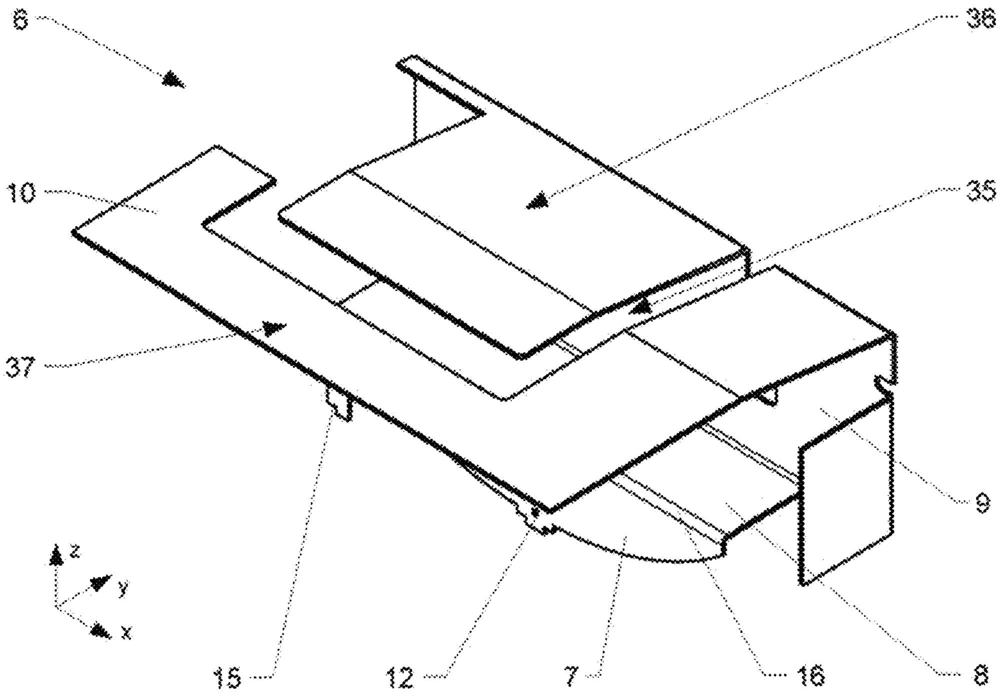
FIG. 10 shows a perspective view on a second variation of the first antenna element from the front and above according to FIG. 9.

FIG. 10 shows a perspective view on a second variation of the first antenna element 6 from the front and above. The shown first antenna element 6 comprises a with respect to the base plate 2 essentially perpendicular arranged first section 7, which is arranged radially towards the center 3. The shown first section 7 comprises a lower edge 11, which lower edge 11 comprises a feeding port 12. The shown feeding port 12 is designed as a foot that extends from the lower edge 11 and is arranged on the top face 4 of the baseplate 2. The shown lower edge 11 comprises a flat portion 33 and a curved portion 14. The curved portion 14 extends between the feeding port 12 and the dorsal end 13 of the first antenna element 6 and extends away from the top face 4 of the base plate 2. The curved portion 14 faces the dorsal end 13 and the flat portion 33 faces the distal end 18, The curved portion 14 merges into a grounding element 15 which is arranged adjacent to the curved portion 14 of the lower edge 11 at the dorsal end 13 of the first antenna element 6. The third 9 and fourth 10 section of the shown first antenna element 6 are split into two radiators with different lengths. The shown channel 35 divides the third 9 and the fourth 10 section into a first radiator 36 and a second radiator 37. In a top view the first radiator 36 has a squared shape and the second radiator 37 is U-shaped and arranged circumferentially around the first radiator 9.

Rather, the words used in the specification are words of description rather than limitation, and it is understood that various changes may be made without departing from the Spirit and scope of the invention.

The invention claimed is:

1. An antenna arrangement comprising a. a baseplate having a center, a bottom face and a top face;

b. at least two first antenna elements arranged on the top face in a rotational symmetric manner with respect to each other, wherein each of the at least two first antenna elements comprises:

i. a first section essentially perpendicularly arranged with respect to the base plate;

ii. the first section merges into a second section arranged with respect to the base plate essentially parallel extending away from the first section in a first direction;

iii. the second section merges into a third section arranged with respect to the base plate essentially perpendicular extending away from the second section above the first section;

iv. the third section merges into a fourth section arranged with respect to the base plate essentially parallel extending away from the third section opposite to the first direction.

2. The antenna arrangement according to claim 1, wherein the first section comprises a lower edge arranged adjacent to the top face and comprising a feeding port to feed a signal into the first antenna element.

3. The antenna arrangement according to claim 2, wherein the lower edge comprises between the feeding port and the dorsal end of the first antenna element a curved portion extending away from the top face of the base plate.

4. The antenna arrangement according to claim 3, wherein the first antenna element comprises a grounding element arranged adjacent to the curved portion of the lower edge at the dorsal end of the first antenna element, interconnecting the first antenna element to the base plate.

5. The antenna arrangement according to claim 1, wherein the first through the fourth sections of the first antenna element are planar and merge into each other by straight edges in an angled manner.

6. The antenna arrangement according to claim 1, wherein the first through the fourth sections form an essentially hook-shaped cross section.

7. The antenna arrangement according to claim 1, wherein a stabilizer is arranged at the least-one of dorsal end of the first antenna element interconnecting at least the fourth section of the first antenna element to the ground plate.

8. The antenna arrangement according to claim 1, wherein the first antenna element comprises at a dorsal end a shielding element being arranged transversal with respect to radial direction of the first antenna element.

9. The antenna arrangement according to claim 8, wherein the shielding element is arranged adjacent to the second section and the third section.

10. The antenna arrangement according to claim 1, wherein at least one fourth section comprises attachment means to attach a second antenna element.

11. The antenna arrangement according to claim 1, wherein the fourth section is arranged at an angle with respect to the top face of the base plate sloping towards the distal end of the first antenna element.

12. The antenna arrangement according to claim 11 wherein in a top view the two first antenna elements are each arranged on an essentially L-shaped conductive layer.

13. The antenna arrangement-according to claim 1, wherein at least one of the third section and the fourth section are split by a channel into a first radiator and a second radiator.

14. The antenna arrangement according to claim 13, wherein in a top view the first radiator has a squared shape and the second radiator is U-shaped and arranged circumferentially around the first radiator.

15. The antenna arrangement according to claim 1, wherein the first antenna element comprises bent sheet metal.

16. The antenna arrangement according to claim 1, wherein the first antenna elements are arranged on the base plate in a windmill-like arrangement equally spaced apart from each other in circumferential direction.

17. The antenna arrangement according to claim 1, wherein a GNSS-antenna is arranged at the center of the base plate.

18. The antenna arrangement according to claim 17, wherein the GNSS-antenna is in a top view arranged between the at least two first antenna elements.

19. The antenna arrangement according to claim 17, wherein the GNSS-antenna is attached to a radome encompassing in an assembled position the at least two first antenna elements.

20. The antenna arrangement according to claim 1, wherein at least one third antenna element is arranged in circumferential direction between neighboring first antenna elements.

* * * * *